United States Patent
Yoshimoto et al.

(10) Patent No.: US 12,500,520 B2
(45) Date of Patent: Dec. 16, 2025

(54) FLEXIBLE SYSTEM FOR CREATING MULTIPLE MAIN SYSTEM RAILS FROM A CURRENT LIMITED INPUT SOURCE

(71) Applicant: Apple Inc., Cupertino, CA (US)

(72) Inventors: Mark A Yoshimoto, San Jose, CA (US); Madhavi V Tagare, San Jose, CA (US); Vijayanish Varadharajan, Milpitas, CA (US); Damon Lee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/632,911

(22) Filed: Apr. 11, 2024

(65) Prior Publication Data

US 2025/0323575 A1   Oct. 16, 2025

(51) Int. Cl.
*H02M 3/158* (2006.01)
*H02M 1/00* (2006.01)

(52) U.S. Cl.
CPC ........... *H02M 3/158* (2013.01); *H02M 1/009* (2021.05)

(58) Field of Classification Search
CPC .... H02M 1/0083; H02M 1/009; H02M 3/158; H02M 3/1582; H02M 3/1584; H02M 3/1586; H02M 3/1588
See application file for complete search history.

(56) References Cited

U.S. PATENT DOCUMENTS

| | | |
|---|---|---|
| 9,917,440 B2 | 3/2018 | Luh et al. |
| 11,476,761 B2 | 10/2022 | Chard et al. |
| 2004/0135562 A1* | 7/2004 | Oden ............... H02M 3/158 323/282 |
| 2019/0044488 A1 | 2/2019 | Travis |
| 2021/0281179 A1 | 9/2021 | Cannillo et al. |
| 2023/0216409 A1 | 7/2023 | Ravi et al. |
| 2023/0345681 A1 | 10/2023 | Sinopoli et al. |
| 2023/0378921 A1 | 11/2023 | Garrett et al. |

FOREIGN PATENT DOCUMENTS

KR   20160080835 A   7/2016

* cited by examiner

*Primary Examiner* — Long Nguyen
(74) *Attorney, Agent, or Firm* — FLETCHER YODER PC

(57) ABSTRACT

A power supply for an electronic device having a plurality of voltage rails including at least one low voltage rail and at least one high voltage rail can include a single inductor multiple output (SIMO) converter. The SIMO converter can include a single inductor; a plurality of switching devices selectively operable as switching converters for producing the plurality of regulated output voltages; and a SIMO power controller including control circuitry that selectively operates the plurality of switching devices responsive at least in part to an input voltage and the plurality of regulated output voltages. The plurality of switching devices can be arranged in a plurality of phases, and the SIMO power controller can include control circuitry for each of the plurality of phases.

19 Claims, 10 Drawing Sheets

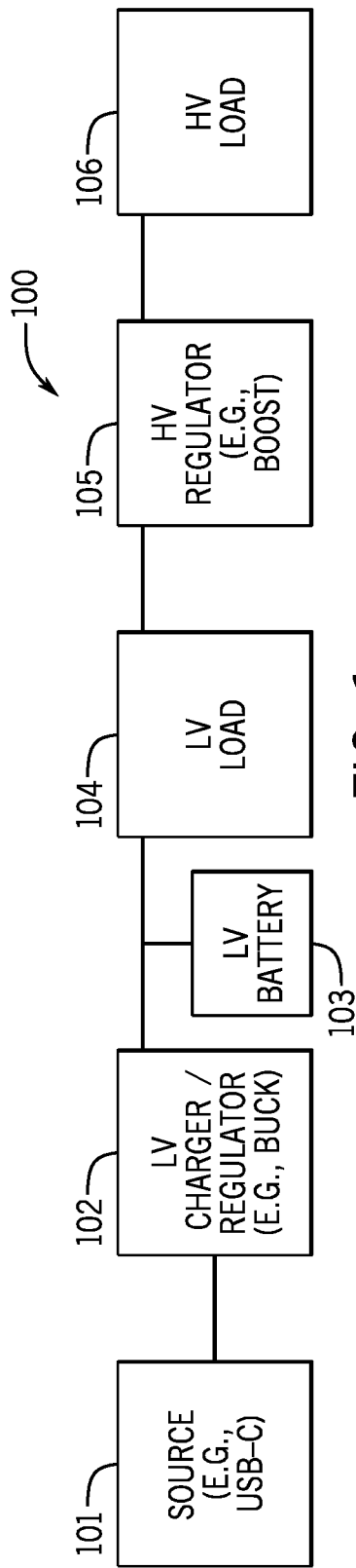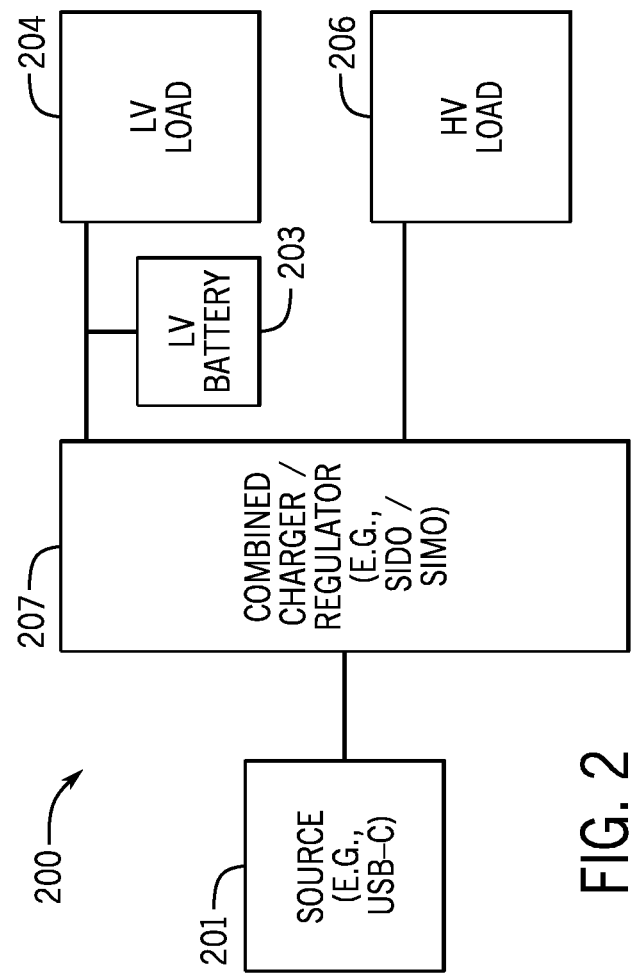

FLEXIBLE SYSTEM FOR CREATING MULTIPLE MAIN SYSTEM RAILS FROM A CURRENT LIMITED INPUT SOURCE

BACKGROUND

Today's electronic systems, including portable electronic systems (e.g., laptop computers, tablet computers, mobile phones, etc.), desktop electronic systems, (e.g., desktop computers, monitors, docking stations, etc.), and accessory systems (e.g., input peripherals, output peripherals, etc.) often require multiple different voltages for various components of such systems. These voltages are provided to various supply rails (also called voltage rails) from which the various components can draw power. In at least some cases, fitting more and more supply rails and the associated voltage conversion and regulation circuitry into smaller and smaller enclosures may become challenging. Further, controlling the amount of power or current that each of these rails draws from the main power source and/or supplies to its loads can also pose challenges. There may also be a wide variety of input sources available to various electronic devices or types of devices. For example, some electronic systems only operate off an AC source without the option for a battery, while still others have both a battery and can operate and charge off an AC source while charging the battery, etc. These varying requirements may pose a wide variety of challenges requiring different solutions.

SUMMARY

Disclosed herein are power supply systems that seek to provide a unified flexible architecture to accommodate disparate power system requirements for a variety of electronic devices that address at least some of the above-discussed challenges.

A power supply for an electronic device having a plurality of voltage rails including at least one low voltage rail and at least one high voltage rail can include a single inductor multiple output (SIMO) converter having a single inductor and an input that receives an input voltage from a source; a first output that delivers a low voltage derived from the input voltage and regulated by the SIMO converter to the low voltage rail; and a second output that delivers a high voltage derived from the input voltage and regulated by the SIMO converter to the high voltage rail.

The power supply can further include at least one energy storage device coupled to at least one of the low voltage rail and the high voltage rail. The at least one energy storage device coupled to at least one of the low voltage rail and the high voltage rail can be a battery coupled to the low voltage rail. The battery coupled to the low voltage rail can have a 1S configuration, and the low voltage rail can have a corresponding voltage. The SIMO converter can derive the high voltage from the energy storage device if the input voltage is unavailable. The at least one energy storage device coupled to at least one of the low voltage rail and the high voltage rail can be a battery coupled to the high voltage rail. The battery coupled to the high voltage rail can have a 2S configuration, and the high voltage rail can have a corresponding voltage. The SIMO converter can derive the low voltage from the energy storage device if the input voltage is unavailable.

A single inductor multiple output (SIMO) converter for producing a regulated low voltage for a low voltage rail and a regulated high voltage for a high voltage rail can include a single inductor; a plurality of switching devices selectively operable as switching converters for producing the plurality of regulated output voltages; and a SIMO power controller including control circuitry that selectively operates the plurality of switching devices responsive at least in part to an input voltage and the plurality of regulated output voltages. The plurality of switching devices can be arranged in a plurality of phases, and the SIMO power controller can include control circuitry for each of the plurality of phases.

The plurality of switching devices can include at least one switching device selectively operable to connect and disconnect the input voltage. The plurality of switching devices can include a first switching device coupled between a main rail of the SIMO converter and a first terminal of the single inductor; a second switching device coupled between the first terminal of the single inductor and ground; a third switching device coupled between a second terminal of the single inductor and the high voltage rail; a fourth switching device coupled between the second terminal of the single inductor and ground; and a fifth switching device coupled between the second terminal of the single inductor and the low voltage rail.

Responsive to the input voltage being higher than the regulated low voltage and lower than the regulated high voltage the SIMO power controller control circuitry can alternate between a first operating mode in which the first and second switching devices are operated in conjunction with the single inductor as a buck converter to produce the regulated low voltage, the fifth switching device is closed to couple the second terminal of the inductor to the low voltage rail, and the third switching device is opened to decouple the second terminal of the single inductor from the high voltage rail; and a second operating mode in which the second switching device is closed to couple the main rail to the first terminal of the single inductor, the third, fourth, and fifth switching devices are operated in conjunction with the single inductor as a boost converter to produce the regulated high voltage, and the fifth switching device is opened to decouple the second terminal of the single inductor from the low voltage rail. If a large load is connected to the low voltage rail, the SIMO power controller control circuitry can alternate between the first and second operating modes and a third operating mode in which the fifth switching device is opened to decouple the second terminal of the inductor from the low voltage rail, the first switching device is closed to couple a first terminal of the inductor to the low voltage rail via a sixth switching device operated by the SIMO power controller control circuitry as at least one of a bypass switch or a low dropout regulator, and the third and fourth switching devices are operated as a buck converter to produce the regulated low voltage from an energy storage device coupled to the high voltage rail.

Responsive to the input voltage being close to the regulated low voltage the SIMO power controller control circuitry can alternate between a first operating mode in which the first, second, and fourth switching devices are operated in conjunction with the single inductor as a buck-boost converter to produce the regulated low voltage, the fifth switching device is closed to couple the second terminal of the inductor to the low voltage rail, and the third switching device is opened to decouple the second terminal of the single inductor from the high voltage rail; and a second operating mode in which the second switching device is closed to couple the main rail to the first terminal of the single inductor, the third, fourth, and fifth switching devices are operated in conjunction with the single inductor as a boost converter to produce the regulated high voltage, and the fifth switching device is opened to decouple the second terminal of the single inductor from the low voltage rail. If a large load is connected to the low voltage rail, the SIMO power controller control circuitry can alternate between the first and second operating modes and a third operating mode in which the fifth switching device is opened to decouple the second terminal of the inductor from the low voltage rail, the first switching device is closed to couple a first terminal of the inductor to the low voltage rail via a sixth switching device operated by the SIMO power controller control circuitry as at least one of a bypass switch or a low dropout regulator, and the third and fourth switching devices are operated as a buck converter to produce the regulated low voltage from an energy storage device coupled to the high voltage rail.

Responsive to the input voltage being higher than the regulated high voltage the SIMO power controller control circuitry can alternate between a first operating mode in which the first and second switching devices are operated in conjunction with the single inductor as a buck converter to produce the regulated low voltage, the fifth switching device is closed to couple the second terminal of the inductor to the low voltage rail, and the third switching device is opened to decouple the second terminal of the single inductor from the high voltage rail; and a second operating mode in which the first and second switching devices are operated in conjunction with the single inductor as a buck converter to produce the regulated high voltage, the third switching device is closed to couple the second terminal of the single inductor to the high voltage rail, and the fifth switching device is opened to decouple the second terminal of the single inductor from the low voltage rail.

Responsive to the input voltage being close to the regulated high voltage the SIMO power controller control circuitry can alternate between a first operating mode in which the first and second switching devices are operated in conjunction with the single inductor as a buck converter to produce the regulated low voltage, the fifth switching device is closed to couple the second terminal of the inductor to the low voltage rail, and the third switching device is opened to decouple the second terminal of the single inductor from the high voltage rail; and a second operating mode in which the first, second, and fourth switching devices are operated in conjunction with the single inductor as a buck converter to produce the regulated high voltage, the third switching device is closed to couple the second terminal of the single inductor to the high voltage rail, and the fifth switching device is opened to decouple the second terminal of the single inductor from the low voltage rail.

Responsive to an absence of the input voltage, the SIMO power controller control circuitry can operate in a mode in which the fifth switching device is opened to decouple the second terminal of the inductor from the low voltage rail, the first switching device is closed to couple a first terminal of the inductor to the low voltage rail via a sixth switching device operated by the SIMO power controller control circuitry as at least one of a bypass switch or a low dropout regulator, and the third and fourth switching devices are operated as a buck converter to produce the regulated low voltage from an energy storage device coupled to the high voltage rail.

Responsive to connection of a load without current limiting being attached to the low voltage bus, the SIMO power controller control circuitry can operate in a mode in which the first and second switching devices are operated in conjunction with the single inductor as a buck converter to produce the regulated high voltage; the fourth switching device is closed to couple the second terminal of the single inductor to the high voltage rail, the fifth switching device is opened to decouple the second terminal of the single inductor from the low voltage rail, and a sixth switching device coupled between the main rail and the low voltage rail is operated as a current limiting device.

Responsive to connection of a load without current limiting being attached to the low voltage bus, the SIMO power controller control circuitry can operate in a mode in which the first, second, and fourth switching devices are operated in conjunction with the single inductor as a buck-boost converter to produce the regulated high voltage; the fourth switching device is closed to couple the second terminal of the single inductor to the high voltage rail, the fifth switching device is opened to decouple the second terminal of the single inductor from the low voltage rail, and a sixth switching device coupled between the main rail and the low voltage rail is operated as a current limiting device.

BRIEF DESCRIPTION OF THE DRAWINGS

FIG. 1 illustrates a block diagram of a prior art dual voltage rail system with a low voltage battery.

FIG. 2 illustrates a block diagram of an embodiment of a dual voltage rail system with a low voltage battery.

DETAILED DESCRIPTION

Figure 3:
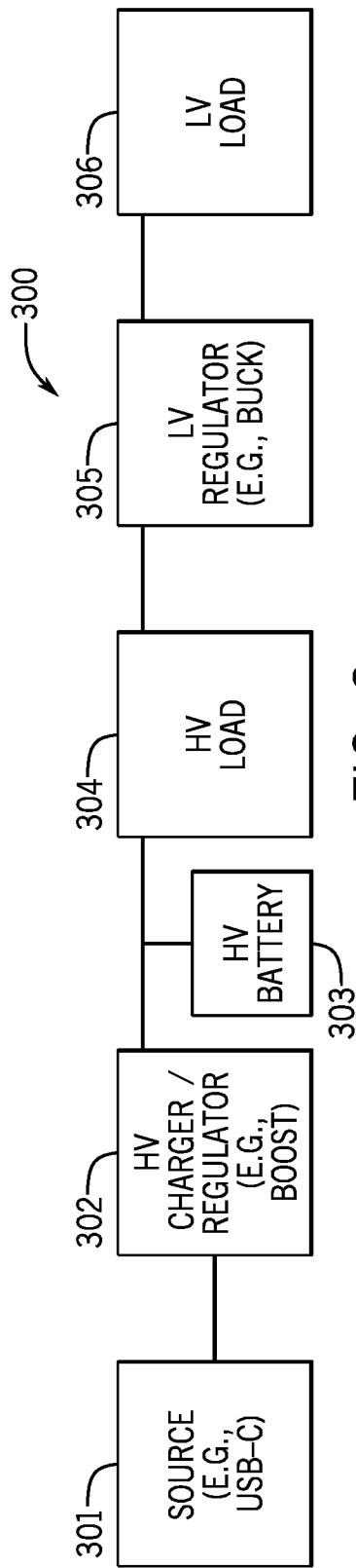
FIG. 3 illustrates a block diagram of a prior art dual voltage rail system with a high voltage battery.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth to provide a thorough understanding of the implementations described herein. In other instances, methods, procedures, and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

The front-end power architecture of an electronic device can be thought of as having an input current/power limit and some kind of regulation scheme that converts this input power source into multiple system voltage rails. These voltage rails can be many and varied. One non-limiting example could be a low voltage rail (e.g., corresponding to 1S lithium-ion battery with a nominal voltage of 3.8V) and a high voltage rail (e.g., corresponding to a 2S lithium-ion battery with a nominal voltage of 7.6V). The terms 1S and 2S refer to the number of series connected cells in a battery. Although this example and other examples discussed herein relate to different battery voltages, the different rails can have any suitable voltage, which need not correspond to a particular battery configuration or even have a battery. Thus, as used herein "low voltage rail" means a rail that has a lower voltage than a "high voltage rail" and vice-versa.

In at least some cases, a "main" voltage rail can be down converted (e.g., bucked) to a lower voltage rail corresponding to a voltage requirement of a particular load or loads. Similarly, a main voltage rail can be up converted (e.g., boosted) to a higher voltage rail corresponding to a higher voltage requirement of a particular load or loads. The input power source can take a variety of forms. In some of the examples described below, the input source can be a USB-C/USB-PD capable power adapter. Such a source can supply different negotiated voltages and currents to the system. In some cases the available voltages may be below, the same as, or above the main voltage rail of the system. Thus, in at least some cases, it may be necessary to either buck or boost the input voltage. The power system architectures described below can provide this type of regulation.

The architectures described below use a Single Inductor Dual Output (SIDO) or Single Inductor Multiple Output (SIMO) configuration. SIDO/SIMO architectures allow the use of a single inductor to create multiple outputs. This can provide advantages, such as space savings. However, because the inductor is a single resource, the multiple (i.e., two or more) output rails may be time multiplexed with the inductor to supply the load power requirements. In some cases, this can lead to increased ripple (i.e., voltage and/or current ripple), poor transient response, and other characteristics that may be undesirable for at least some applications. However, for the architectures described herein, the larger ripple and/or decreased transient response can be tolerated as it appears only the main system rail, which can be converted by a further regulation stage. In many applications, the main system rail(s) can be assumed to be noisy since they are shared amongst many switching loads. In other words, the noise of the main system rail(s) can be rejected by the next converter stage.

Furthermore, in at least some applications using battery-based systems, increased ripple can be tolerated if it is provided to a battery charger, where the voltage will be further regulated (e.g., down-converted) to charge the battery. Also, this large ripple can be tolerated if it's the output of a charger system, where the input voltage is down-converted to charge a battery. Moreover, the battery can also be seen as a large charge reservoir to supplement any droops (e.g., voltage dips) in the system. Thus, the exemplary architectures described herein may be advantageously employed in battery charger systems, but need not be so limited and can even be used in systems where no battery is present.

Another potential benefit of the systems and architectures described herein relates to their use in systems that must support both low voltage loads and peaky high voltage loads. Many electronic devices can pose challenges relating to the use of loads that require a low battery voltage range to maximize system efficiency but also include some loads that require boosting up to much higher voltages. With the architectures described herein, both loads can be serviced from the same architecture, and the low voltage load can be prioritized while charging a high voltage battery and supplying high voltage loads directly from the input source. This can prevent having to go through an inefficient two stage topology of bucking down from an input source followed by a separate boosting up for the higher voltage loads.

FIGS. 1-6 provide a high-level overview of the overall architectures proposed. The illustrated examples contrast standard multi-stage conversion designs (illustrated in FIGS. 1, 3, and 5) to supply two system rails, labeled as low voltage ("LV") and high voltage ("HV") with alternative architectures (illustrated in FIGS. 2, 4, and 6) that use SIDO/SIMO single stage conversion to produce corresponding low voltage and high voltage rails. As discussed above, the term low voltage refers to a voltage that is lower than the high voltage, and the term high voltage refers to a voltage that is higher than the low voltage. Each voltage can otherwise take on a wide variety of values and is not limited to any particular voltage or voltage range. Additionally, although described in terms of two rails, such systems could include more than two voltage rails, including one or more lower voltage rails having voltages lower than the one or more higher voltage rails and vice-versa. Additionally, the systems may include an energy storage component on either or both of the low voltage rail or high voltage rail, with the energy storage component being a battery, super capacitor, or other suitable energy storage device.

FIG. 1 illustrates a block diagram of a prior art dual voltage rail system 100 with a low voltage battery 103. A source 101 can provide an input voltage and current to a first stage converter 102 in the form of low voltage charger/regulator. As one example, the low voltage charger regulator can be a buck converter that down-converts or "bucks" the input voltage from source 101 to a lower voltage that can be provided to a lower voltage rail. A low voltage battery 103 (or other energy storage component) can be coupled to the low voltage rail along with one or more low voltage loads 104. Also coupled to the low voltage rail can be a second stage converter 105 in the form of a high voltage regulator. This high voltage regulator can be thought of as one of the loads on the low voltage rail. The high voltage regulator can be a boost converter that up-converts or "boosts" the low voltage rail to a high voltage used by high voltage load(s) 106.

FIG. 2 illustrates a block diagram of an embodiment of a dual voltage rail system 200 with a low voltage battery 203. A source 201 can provide an input voltage and current to a combined charger/regulator 207, which can be a SIDO/SIMO converter as described in greater detail below. The combined charger/regulator 207 can provide a low voltage rail that powers one or more low voltage loads 204. A low voltage battery 203 can also be coupled to the low voltage rail and can either be charged therefrom or can provide power thereto, for example depending on whether source 201 is available or not. The combined charger/regulator 207 can also provide a high voltage rail that can power one or more high voltage loads 206.

FIG. 3 illustrates a block diagram of a prior art dual voltage rail system 300 with a high voltage battery 303. A source 301 can provide an input voltage and current to a first stage converter 302 in the form of high voltage charger/regulator. As one example, the high voltage charger regulator can be a boost converter that up-converts or "boosts" the input voltage from source 301 to a higher voltage that can be provided to a high voltage rail. A high voltage battery 303 (or other energy storage component) can be coupled to the high voltage rail along with one or more high voltage loads 304. Also coupled to the high voltage rail can be a second stage converter 305 in the form of a low voltage regulator. This low voltage regulator can be thought of as one of the loads on the high voltage rail. The low voltage regulator can be a buck converter that down-converts or "bucks" the high voltage rail to a low voltage used by low voltage load(s) 306.

Figure 4:
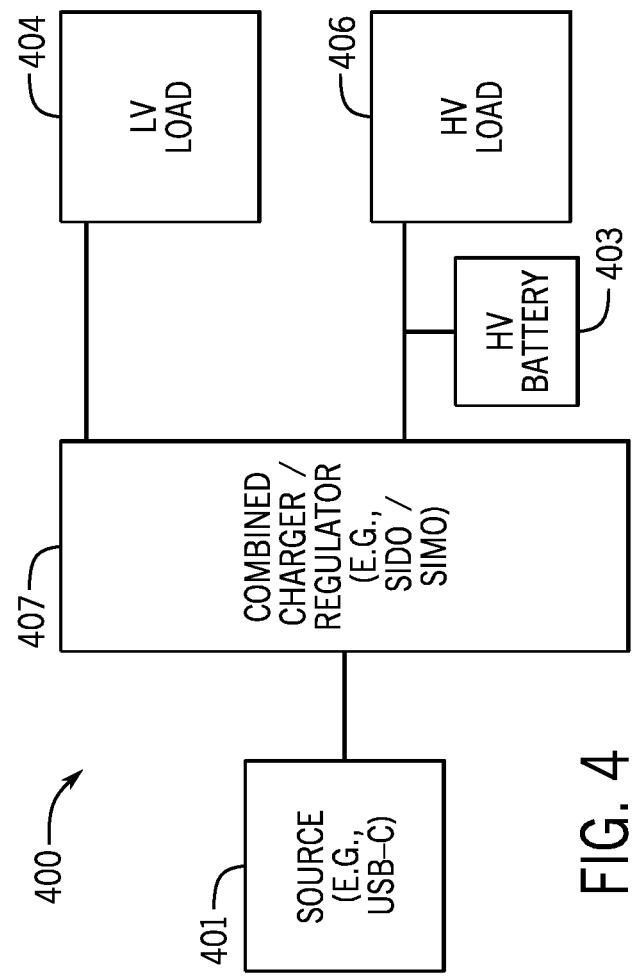
FIG. 4 illustrates a block diagram of an embodiment of a dual voltage rail system with a high voltage battery.

FIG. 4 illustrates a block diagram of an embodiment of a dual voltage rail system 400 with a high voltage battery 403. A source 401 can provide an input voltage and current to a combined charger/regulator 407, which can be a SIDO/SIMO converter as described in greater detail below. The combined charger/regulator 407 can provide a low voltage rail that powers one or more low voltage loads 404. The combined charger/regulator 407 can also provide a high voltage rail that can power one or more high voltage loads 406. A high voltage battery 403 can also be coupled to the high voltage rail and can either be charged therefrom or can provide power thereto, for example depending on whether source 401 is available or not.

Figure 5:
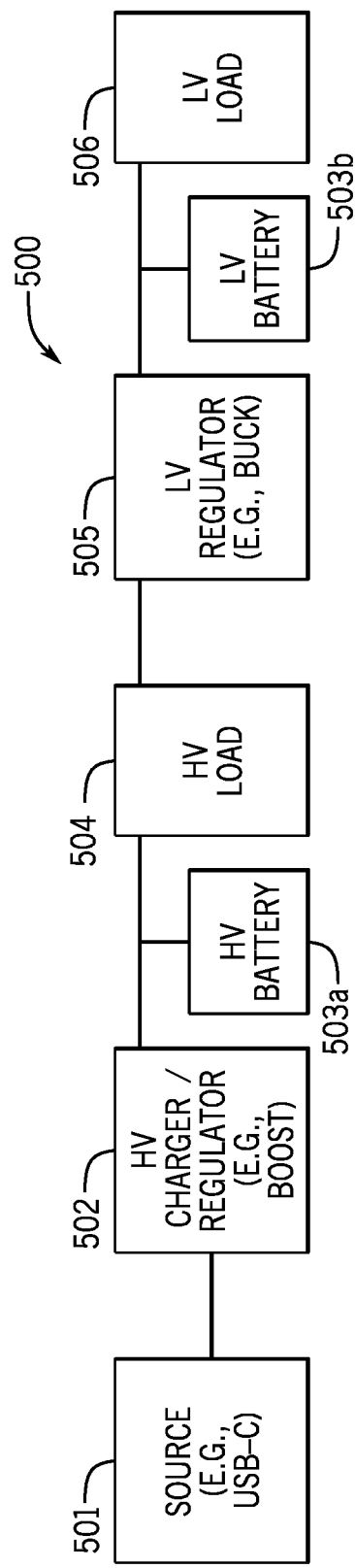
FIG. 5 illustrates a block diagram of a prior art dual voltage rail system with dual (high and low) voltage batteries.

FIG. 5 illustrates a block diagram of a prior art dual voltage rail system 500 with dual (high and low) voltage batteries 503*a*/503*b*. A source 501 can provide an input voltage and current to a first stage converter 502 in the form of high voltage charger/regulator. As one example, the high voltage charger regulator can be a boost converter that up-converts or "boosts" the input voltage from source 501 to a higher voltage that can be provided to a high voltage rail. A high voltage battery 503*a* (or other energy storage component) can be coupled to the high voltage rail along with one or more high voltage loads 504. Also coupled to the high voltage rail can be a second stage converter 505 in the form of a low voltage regulator. This low voltage regulator can be thought of as one of the loads on the high voltage rail. The low voltage regulator can be a buck converter that down-converts or "bucks" the high voltage rail to a low voltage used by low voltage load(s) 506. A low voltage battery 503*b* (or other energy storage component) can be coupled to the low voltage as well. A dual battery/dual conversion system could also be constructed along the lines of FIG. 1, with the low system first and the high voltage rail being boosted therefrom.

Figure 6:
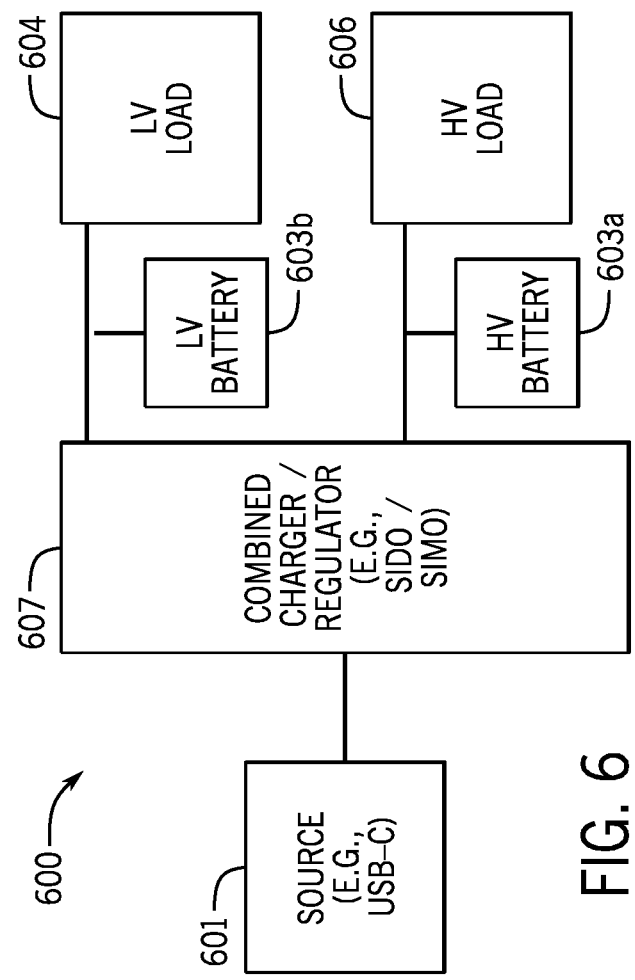
FIG. 6 illustrates a block diagram of an embodiment of a dual voltage rail system with dual (high and low) voltage batteries.

FIG. 6 illustrates a block diagram of an embodiment of a dual voltage rail system 600 with dual (high and low) voltage batteries 603*a*/603*b*. A source 601 can provide an input voltage and current to a combined charger/regulator 607, which can be a SIDO/SIMO converter as described in greater detail below. The combined charger/regulator 607 can provide a low voltage rail that powers one or more low voltage loads 604. A low voltage battery 603*b* can also be coupled to the low voltage rail and can either be charged therefrom or can provide power thereto, for example depending on whether source 601 is available or not. The combined charger/regulator 607 can also provide a high voltage rail that can power one or more high voltage loads 606. A high voltage battery 603 can also be coupled to the high voltage rail and can either be charged therefrom or can provide power thereto, for example depending on whether source 601 is available or not.

In the prior art systems of FIGS. 1, 3, and 5, the most downstream voltage rails require two conversion stages, which reduces the overall efficiency of producing. For example, if both the HV and LV converters operate at 96% efficiency, the net efficiency will be approximately 92%. Conversely, in the SIDO/SIMO examples of FIGS. 2, 4, and 6, each rail requires only a single conversion stage, and can thus operate with a higher efficiency.

Figure 7:
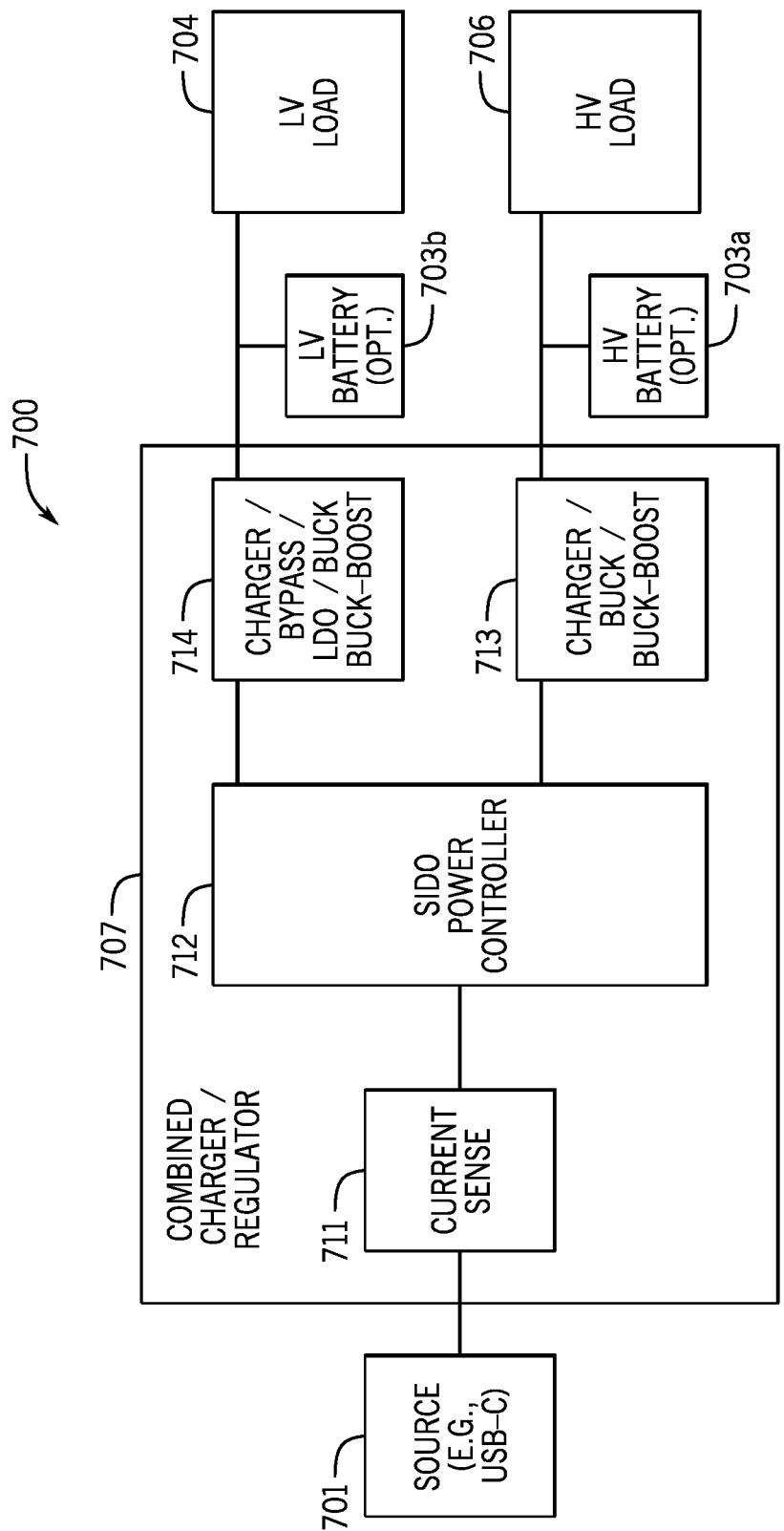
FIG. 7 illustrates a block diagram of a combined charger regulator for the dual voltage rail systems described above.

FIG. 7 illustrates a block diagram of a combined charger regulator 707 for a dual voltage rail system 700, such as the dual voltage rail systems described above with reference to FIGS. 2, 4, and 6. A source 701 can provide an input voltage and current to a combined charger/regulator 707, which can be a SIDO/SIMO converter. The combined charger/regulator 707 can include input current sensing 711 that can sense the input current. The combined charger/regulator can further include a SIDO (or SIMO) power controller 712 that can regulate the sensed input current to remain within an appropriate current limit (e.g., a current limit negotiated with a USB-C/USB-PD source). The SIDO power controller can further operate a low voltage converter 714 and a high voltage converter 713 to provide the respective low and high voltage rails. More specifically, the low voltage converter 714 and high voltage converter 713 can include a single, common inductor and a plurality of switching devices. The switching devices may be shared among the two converters, as illustrated in various examples below. SIDO (or SIMO) power controller 712 can operate these switching devices to provide the respective low voltage and high voltage rails. For example, a first subset of the switching devices may be operated part of the time in connection with the single inductor as a charger, bypass, low dropout (LDO) regulator, buck converter, buck-boost converter, etc. to produce the low voltage for the low voltage rail. Similarly, a second subset of the switching devices may be operated during another part of the time in connection with the single inductor as a charger, buck converter, boost converter, boost converter, etc. to produce the high voltage for the high voltage rail. One or more low voltage loads 704 can be coupled to the low voltage rail. Optionally, a low voltage battery (or other energy storage device) 703*b* can also be coupled to the low voltage rail. Similarly, one or more high voltage loads 706 can be coupled to the high voltage rail, and optionally, a high voltage battery (or other energy storage device) 703*a* can also be coupled to the high voltage rail.

Figure 8:
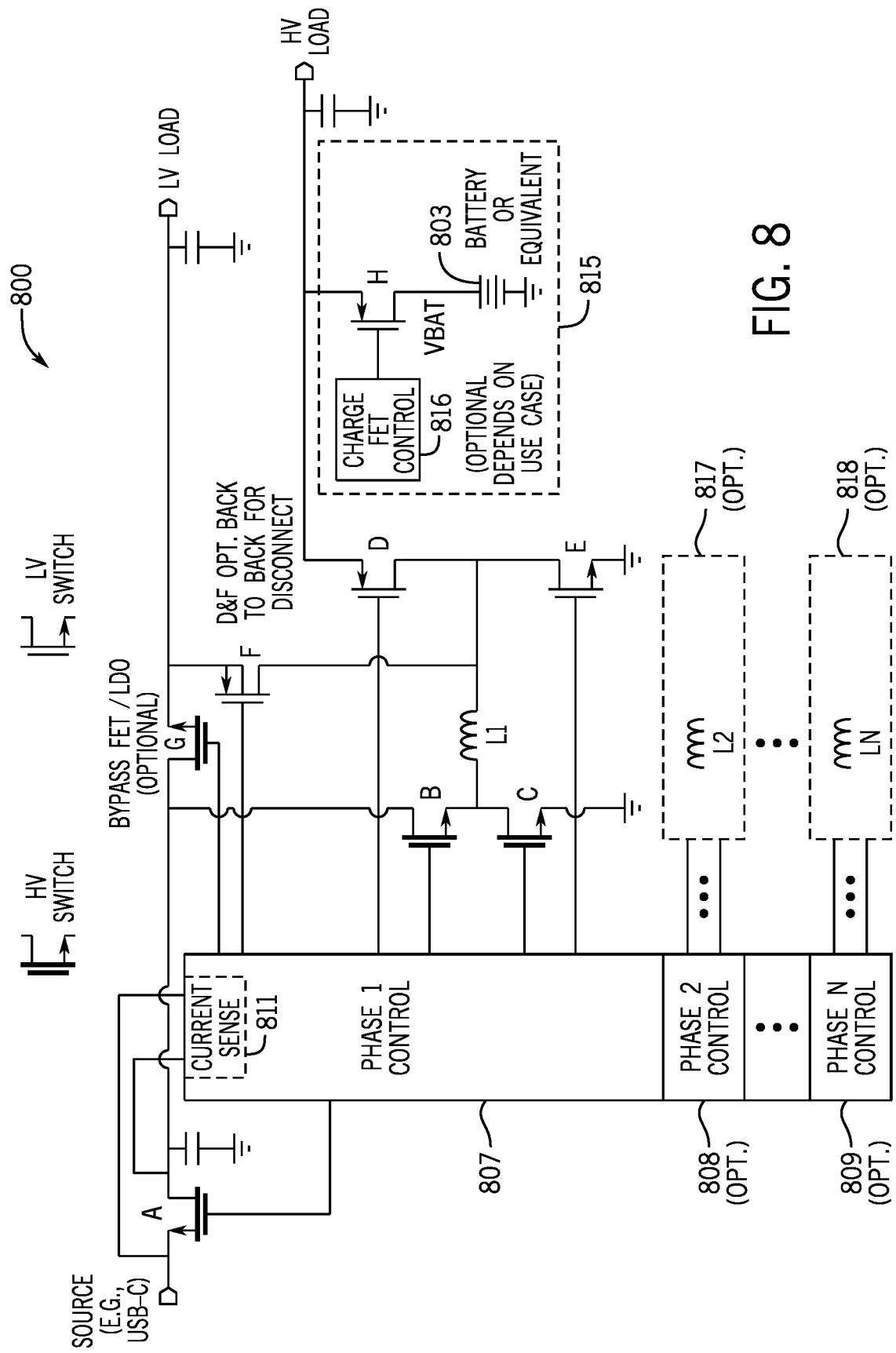
FIG. 8 illustrates a schematic diagram of an embodiment of a multi-voltage rail system.

FIG. 8 illustrates a schematic diagram of a SIDO converter 800 for use with the systems described above with reference to FIGS. 2, 4, 6, and 7. SIDO converter 800 can include a plurality of switching devices A-G, that are selectively operable by SIDO power controller 807 to cooperate with the single inductor L1 to produce the low voltage rail (LV Load) and high voltage rail (HV Load) as generally described above. As used herein, a single inductor may (but need not) include multiple physical inductors coupled in series or parallel to provide a desired inductance (or other physical properties). However, to be a "single" inductor as described herein, the inductor must be operated as a single two terminal device having the circuit parameters of a single inductor. In some embodiments, the SIDO converter 800 can be a multi-phase converter to provide for additional current capability. In such case, the SIDO controller can include additional phase control circuitry 808/809 for controlling additional "single" inductors L2, ..., Ln and corresponding switches 817/818 (e.g., switches corresponding to switches B-G) to provide the required output current. The operating principles of such multi-phase systems are as described herein for single phase systems.

As noted above, each phase of SIDO converter 800 can include multiple switching devices A-G. In some embodiments, switching devices having different voltage ratings can be used for switches associated with the high voltage rail versus switches used with the low voltage rail. In the schematics of FIGS. 8-13, different symbols are used to illustrate the respective switch types. However, in other embodiments, the same switch types could be used for all switching devices. Additionally, the switches are illustrated as being MOSFET devices, although other semiconductor switching devices (e.g., JFETs, BJTs, IGBTs, etc.) could also be used. Such switching devices can be fabricated using any suitable semiconductor technology, such as silicon (Si), silicon carbide (SiC), gallium nitride (GaN), etc.

As described above, the input current can be sensed (e.g., by current sense circuitry 811) that can be part of the SIDO power controller 807. SIDO power controller 807 can implement any combination of analog, digital, and/or programmable circuitry to provide the control functionality herein. For example, the controller circuitry can be implemented using a programmable microcontroller that can provide control functionality including (but not limited to): limiting the total current/power draw of the system to an appropriate input current/power limit and selectively operating the respective switching devices in conjunction with the corresponding "single" inductor to provide the regulated low voltage and high voltage rails. This latter control functionality can include implementing one or more voltage regulation and/or current regulation control loops suitable for operating various subsets of the switching devices as buck, boost, buck-boost, and other converter types. Additionally, the control circuitry can implement functionalities, such as overcurrent protection, overtemperature protection, over/undervoltage protection, etc.

As described with reference to FIG. 7, SIDO converter 800 can receive a voltage/current from a source, which can be selectively coupled to a "main" rail 831 by an input switching device A. For systems that include a battery (or other energy storage source) allowing operation without a source available, input switching device A can be selectively opened to disconnect the input, if desired. Switches B-E can be configured in two respective half bridges (BC and DE) coupled to respective terminals of the single inductor L1. This can allow for bi-directional buck, boost, or buck-boost operation, as described in greater detail below. SIDO converter 800 can also include switching device F for selectively coupling one terminal of single inductor L1 to the low voltage rail LV Load. As can be seen in FIG. 8, switching device D also serves to selectively couple the inductor to the high voltage rail HV Load. Thus, both switches D and F may optionally be implemented as back-to-back switches to provide for a bi-directional disconnect device. Finally, the switches of SIDO converter 800 can include an optional bypass/low dropout (LDO) regulator switching device G. This can allow the main rail 831 to be "directly" coupled to the low voltage rail LV load, either completely bypassing inductor L1 (if switching device G is turned completely on) or with linear voltage regulation (if switching device G is controlled within its active region to produce a desired voltage drop to regulate the low voltage rail from a potentially varying main rail 831). In all cases, the switching devices A-G are controlled by SIDO power controller 807.

Also depicted in FIG. 8, although not necessarily part of SIDO converter 800 is optional battery (energy storage) block 815. This block can include a battery or other energy storage device 803, a charging FET H (or other switching device/regulator), and a charging FET controller 816. Charging FET controller 816 (which can be implemented using any suitable combination of analog, digital, and/or programmable circuitry, such as a programmable microcontroller) can operate charging FET H (or other switching device/regulator) to produce a target battery charging current and/or battery charging voltage based on a desired battery charging profile. In FIG. 8, battery block 815 is illustrated as coupled to the high voltage rail HV Load, but a battery block could additionally or optionally be coupled to the low voltage rail LV Load, as was described above with reference to FIGS. 2 and 6.

Figure 9:
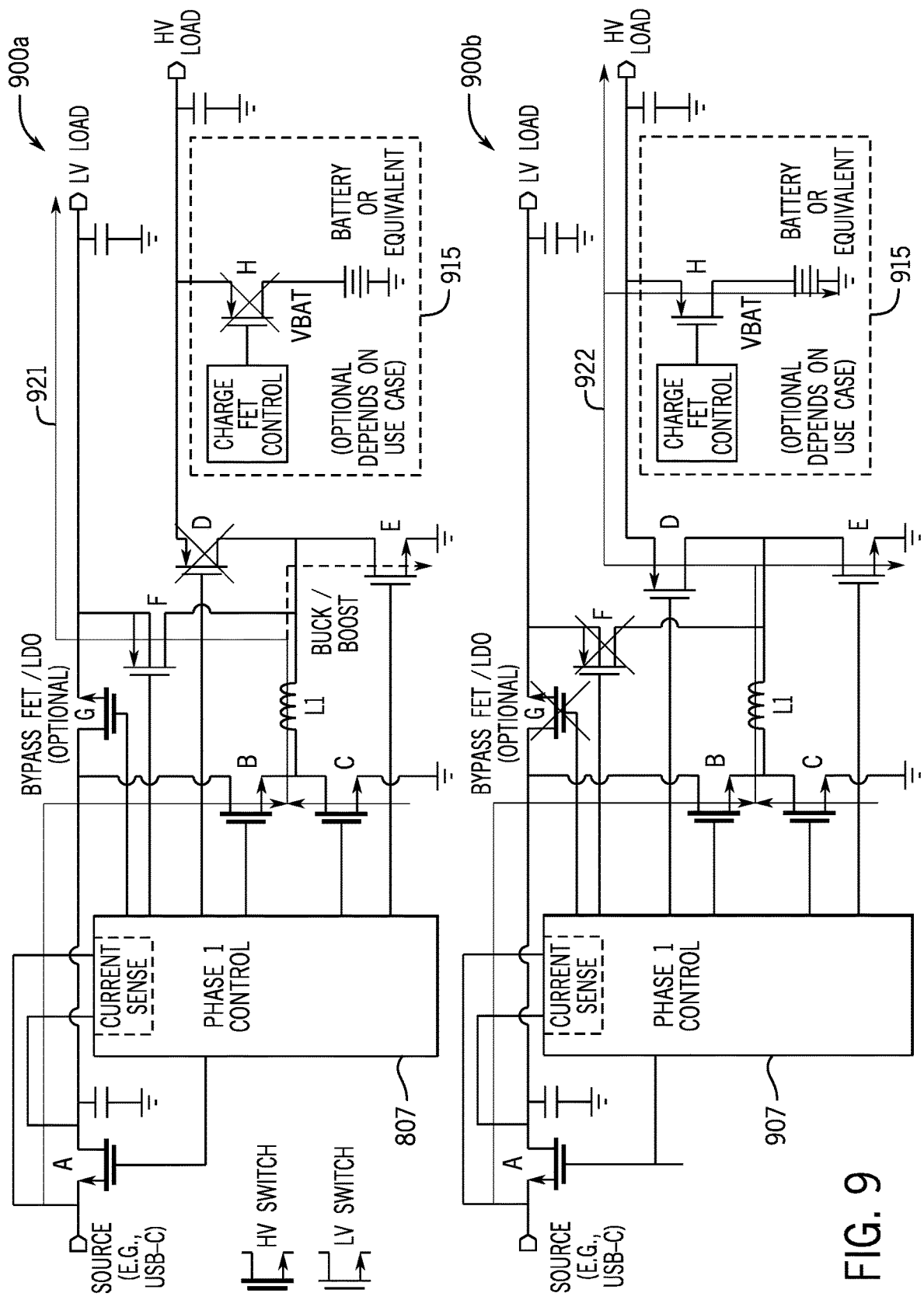
FIG. 9 illustrates schematic diagrams of a dual voltage rail system regulating from a low voltage input source.

FIG. 9 illustrates schematic diagrams 900a/900b of a dual voltage rail system regulating from a low voltage input source. During a first portion of time, illustrated in schematic 900a, SIDO power controller 907 can operate switching devices A-G as follows. Switching device A can be closed to allow power to flow via the main rail. Switching devices B and C can be operated in conjunction with single inductor L1 as a buck converter to supply power to the low voltage rail LV Load via current path 921. More specifically, half bridge BC can be controlled using suitable control loops, e.g., implementing duty cycle control of switching devices B and C, which are switched on and off complementarily, to produce a desired output voltage from the buck converter. Switching device D can be turned off to decouple the high voltage rail HV load from the inductor/converter. During this time interval, the SIDO converter is being used to power the low voltage rail LV load, not the high voltage rail HV Load. Switching device E can optionally be used to operate in conjunction with switching devices B and C as a buck-boost converter, allowing a voltage higher than the input source voltage to be provided to the low voltage rail LV Load. Such operating mode can thus be determined responsive to the input voltage. Switching device F can be turned on and remain on to couple the inductor L1 (operating as a buck or optionally buck-boost inductor) output to the low voltage rail LV Load. Switching device G, which is optional, can be turned off, as the low voltage load is being powered by the buck (or buck boost) operation of switching devices B and C (and optionally E) in connection with single inductor L1, and thus the bypass/LDO functionality is not required. Finally, charging FET H can be disabled to prevent potentially undesirable siphoning of energy from the high voltage rail HV Load during the period of time that the SIDO converter is providing power to the low voltage rail LV Load. Alternatively, charging FET H can optionally be turned on to allow the battery to "prop up" the high voltage rail during this time period. If a battery module were coupled to the low voltage rail, then it could be enabled to allow charging during this time period.

During a second portion of time, illustrated in schematic 900b, SIDO power controller 907 can operate switching devices A-G as follows. Switching device A can be closed to allow power to flow via the main rail. Switching devices B can be turned on to allow power to reach single inductor L1. Switching devices D and E can be operated in conjunction with single inductor L1 as a boost converter to supply power to the high voltage rail HV Load via current path 922. More specifically, switching device E can be operated as a boost switch using suitable control loops, e.g., implementing duty cycle control to produce a desired output voltage from the boost converter. Switching device D can be switched complementarily to switching device E to provide boost diode functionality. Alternatively, switching devices C, D, and E can be operated in conjunction with single inductor L1 as a buck-boost converter. In either case, switching device F can be turned off and remain off to decouple the inductor L1 (operating as a boost inductor) output from the low voltage rail LV Load. Switching device G, which is optional, can be turned off, as the low voltage rail can be supported during this time interval by the output capacitor. Finally, charging FET H can be enabled to allow battery charging during this time period.

Alternation between the two modes illustrated by schematics 900a and 900b can allow for the SIDO power controller 907 to regulate both voltage rails. Priority can be given to the more heavily loaded rail, depending on usage. For example, the respective differences between the nominal voltage of each rail and the actual voltage of each rail can be compared, and the SIDO power controller can switch to providing power to the rail having greater deviation from its nominal value. In some cases, the battery (or other energy storage) module 915 can be used to "prop up" its rail when the SIDO converter is regulating the other rail. As illustrated in FIG. 9, this would be propping up the high voltage rail HV Load when regulating the low voltage rail LV load as depicted in schematic 900a. However, as noted above, battery module 915 could be connected to either rail, or battery modules could be provided for each rail.

Figure 10:
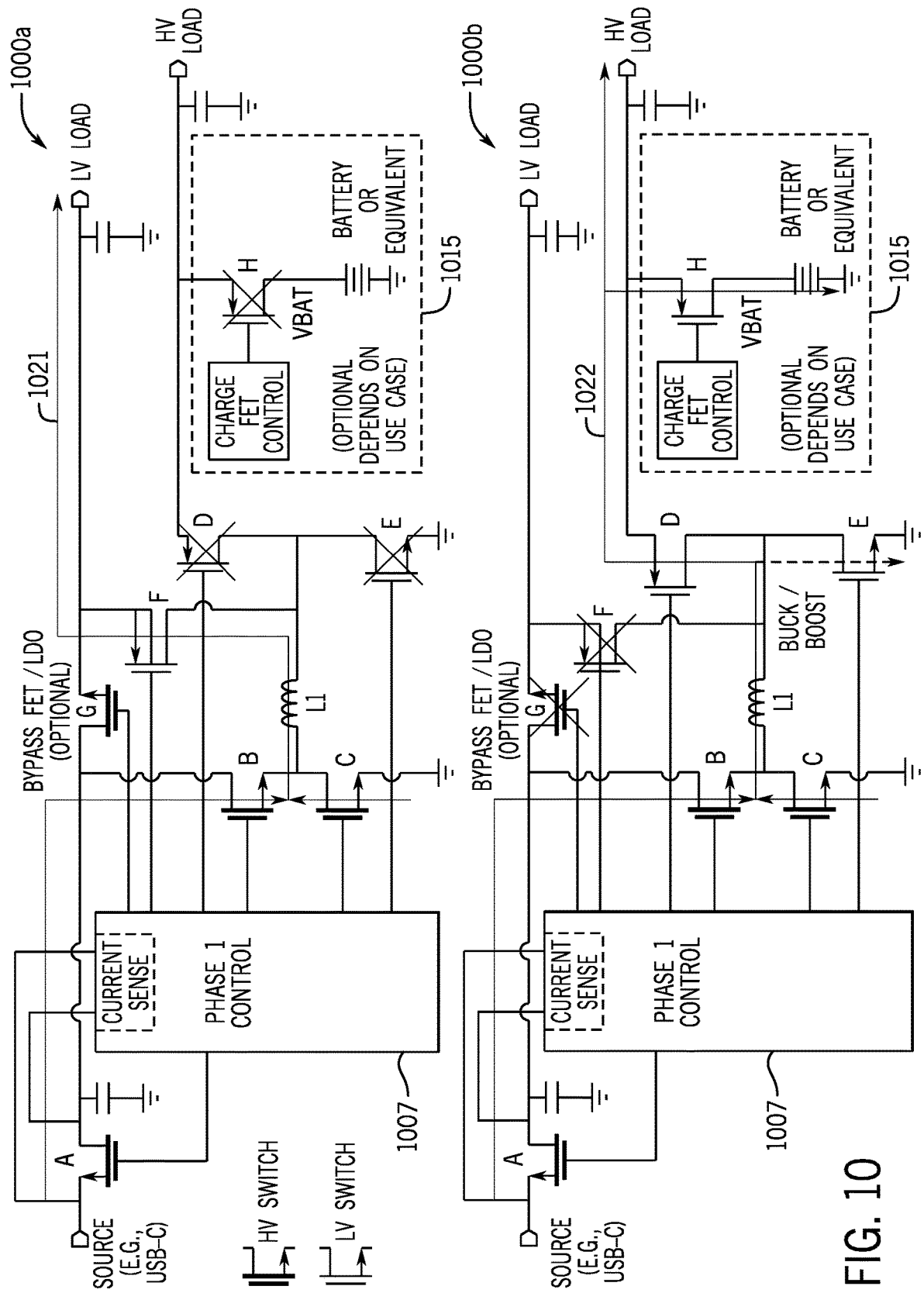
FIG. 10 illustrates schematic diagrams of a dual voltage rail system regulating from a high voltage input source.

FIG. 10 illustrates schematic diagrams 1000a/1000b of a dual voltage rail system regulating from a high voltage input source. During a first portion of time, illustrated in schematic 1000a, SIDO power controller 1007 can operate switching devices A-G as follows. Switching device A can be closed to allow power to flow via the main rail. Switching devices B and C can be operated in conjunction with single inductor L1 as a buck converter to supply power to the low voltage rail LV Load via current path 1021. More specifically, half bridge BC can be controlled using suitable control loops, e.g., implementing duty cycle control of switching devices B and C, which are switched on and off complementarily, to produce a desired output voltage from the buck converter. Switching device D can be turned off to decouple the high voltage rail HV load from the inductor/converter. During this time interval, the SIDO converter is being used to power the low voltage rail LV load, not the high voltage rail HV Load. Switching device E can also be turned off during this interval, as a high voltage source will presumably be a higher voltage than the low voltage rail. Switching device F can be turned on and remain on to couple the inductor L1 (operating as a buck or optionally buck-boost inductor) output to the low voltage rail LV Load. Switching device G, which is optional, can be turned off, as the low voltage load is being powered by the buck operation of switching devices B and C in connection with single inductor L1, and thus the bypass/LDO functionality is not required. Finally, charging FET H can be disabled to prevent potentially undesirable siphoning of energy from the high voltage rail HV Load during the period of time that the SIDO converter is providing power to the low voltage rail LV Load. Alternatively, charging FET H can optionally be turned on to allow the battery to "prop up" the high voltage rail during this time period. If a battery module were coupled to the low voltage rail, then it could be enabled to allow charging during this time period.

During a second portion of time, illustrated in schematic 1000b, SIDO power controller 1007 can operate switching devices A-G as follows. Switching device A can be closed to allow power to flow via the main rail. Switching devices B, C, and E can be operated in conjunction with single inductor L1 as a buck-boost converter to supply power to the high voltage rail HV Load via current path 1022. Alternatively, depending on the input voltage, switching devices B and C can be operated in conjunction with single inductor L1 as a buck converter. In either case, switching device D can be turned on to couple the inductor output to the high voltage rail HV load, and switching device F can be turned off and remain off to decouple the inductor L1 (operating as a boost inductor) output from the low voltage rail LV Load. Switching device G, which is optional, can be turned off, as the low voltage rail can be supported during this time interval by the output capacitor. Finally, charging FET H can be enabled to allow battery charging during this time period.

Alternation between the two modes illustrated by schematics 1000a and 1000b can allow for the SIDO power controller 907 to regulate both voltage rails. Priority can be given to the more heavily loaded rail, depending on usage. For example, the respective differences between the nominal voltage of each rail and the actual voltage of each rail can be compared, and the SIDO power controller can switch to providing power to the rail having greater deviation from its nominal value. In some cases, the battery (or other energy storage) module 1015 can be used to "prop up" its rail when the SIDO converter is regulating the other rail. As illustrated in FIG. 10, this would be propping up the high voltage rail HV Load when regulating the low voltage rail LV load as depicted in schematic 1000a. However, as noted above, battery module 1015 could be connected to either rail, or battery modules could be provided for each rail. Finally, charging FET H can be disabled to prevent potentially undesirable siphoning of energy from the high voltage rail HV Load during the period of time that the SIDO converter is providing power to the low voltage rail LV Load. Alternatively, charging FET H can optionally be turned on to allow the battery to "prop up" the high voltage rail during this time period.

Figure 11:
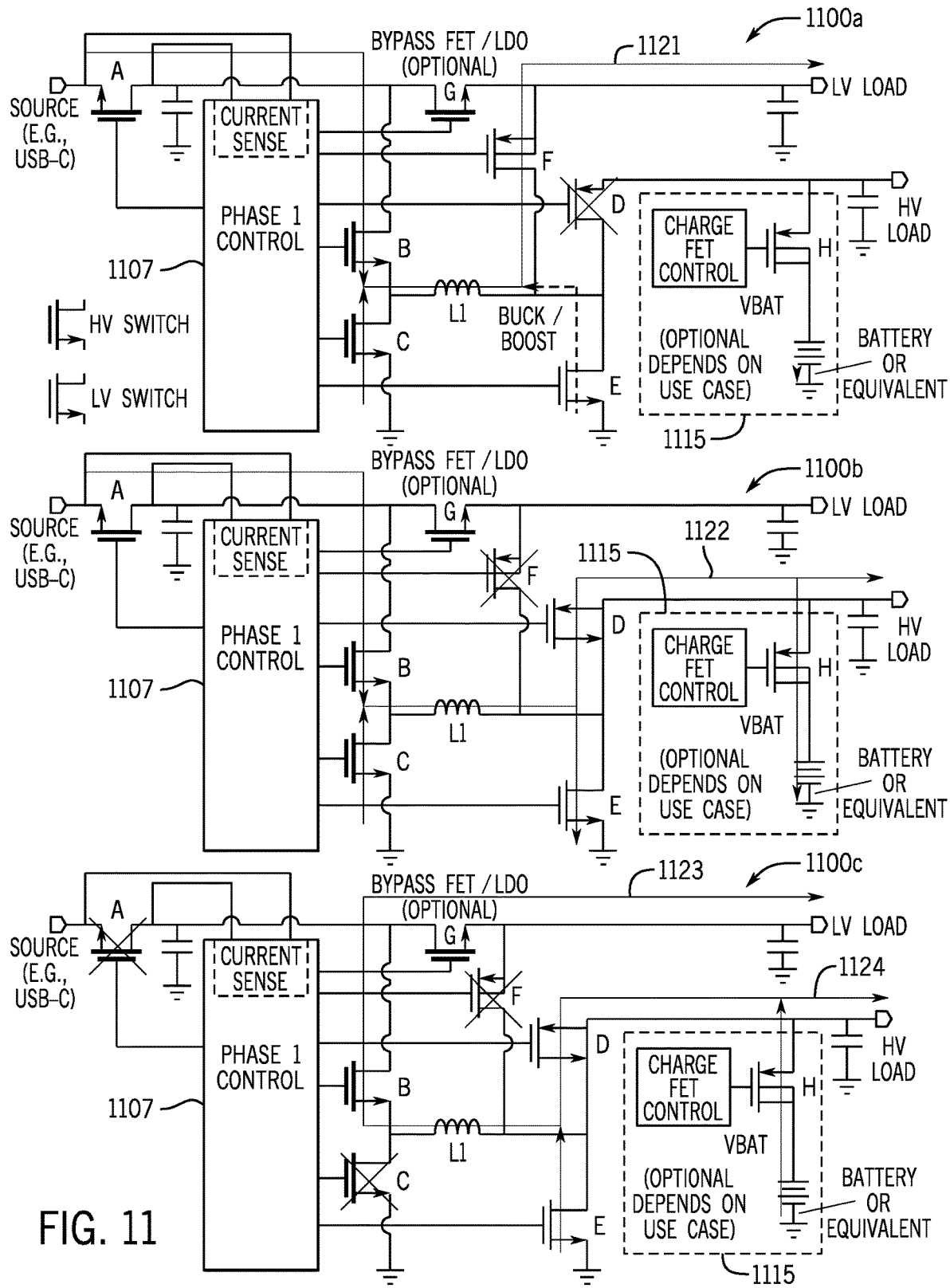
FIG. 11 illustrates schematic diagrams of a dual voltage rail system regulating from a low voltage input source with a high load on the low voltage rail.

FIG. 11 illustrates schematic diagrams 1100a/1100b/1100c of a dual voltage rail system regulating from a low voltage input source with a high load on the low voltage rail. During a first portion of time, illustrated in schematic 100a, SIDO power controller 1107 can operate switching devices A-G as follows. Switching device A can be closed to allow power to flow via the main rail. Switching devices B and C can be operated in conjunction with single inductor L1 as a buck converter to supply power to the low voltage rail LV Load via current path 1121. More specifically, half bridge BC can be controlled using suitable control loops, e.g., implementing duty cycle control of switching devices B and C, which are switched on and off complementarily, to produce a desired output voltage from the buck converter. Switching device D can be turned off to decouple the high voltage rail HV load from the inductor/converter. During this time interval, the SIDO converter is being used to power the low voltage rail LV load, not the high voltage rail HV Load. Switching device E can optionally be used to operate in conjunction with switching devices B and C as a buck-boost converter, allowing a voltage higher than the input source voltage to be provided to the low voltage rail LV Load. Such operating mode can thus be determined responsive to the input voltage. Switching device F can be turned on and remain on to couple the inductor L1 (operating as a buck or optionally buck-boost inductor) output to the low voltage rail LV Load. Switching device G, which is optional, can be turned off, as the low voltage load is being powered by the buck (or buck boost) operation of switching devices B and C (and optionally E) in connection with single inductor L1, and thus the bypass/LDO functionality is not required. Finally, charging FET H can be disabled to prevent potentially undesirable siphoning of energy from the high voltage rail HV Load during the period of time that the SIDO converter is providing power to the low voltage rail LV Load. Alternatively, charging FET H can optionally be turned on to allow the battery to "prop up" the high voltage rail during this time period. If a battery module were coupled to the low voltage rail, then it could be enabled to allow charging during this time period.

During a second portion of time, illustrated in schematic 1100b, SIDO power controller 1107 can operate switching devices A-G as follows. Switching device A can be closed to allow power to flow via the main rail. Switching device B can be turned on to allow power to reach single inductor L1. Switching devices D and E can be operated in conjunction with single inductor L1 as a boost converter to supply power to the high voltage rail HV Load via current path 1122. More specifically, switching device E can be operated as a boost switch using suitable control loops, e.g., implementing duty cycle control to produce a desired output voltage from the boost converter. Switching device D can be switched complementarily to switching device E to provide boost diode functionality. Alternatively, switching devices C, D, and E can be operated in conjunction with single inductor L1 as a buck-boost converter. In either case, switching device F can be turned off and remain off to decouple the inductor L1 (operating as a boost inductor) output from the low voltage rail LV Load. Switching device G, which is optional, can be turned off, as the low voltage rail can be supported during this time interval by the output capacitor. Finally, charging FET H can be enabled to allow battery charging during this time period.

During a third portion of time, illustrated in schematic 1100c, SIDO power controller 1107 can operate switching devices A-G as follows. Switching device A can be opened to prevent power to flow via the main rail, which can be desirable if the source is unable to supply sufficient power to power the high load on the low voltage rail LV Load. The low voltage rail LV Load can thus be supplied by bucking down from high voltage battery module 1115. That is, switches D and E can cooperate with single inductor L1 to operate as a buck converter, supplying the low voltage rail via current path 1124. Switching device B can close to couple the buck converter output to the low voltage rail via bypass/LDO switching device G, which would not be optional in this configuration. Switching device C can be opened during this mode. Meanwhile, the high voltage rail HV Load can be powered directly by battery module 1115 during this interval via current path 1124.

Alternation between the three modes illustrated by schematics 1100a, 1100b, and 1100c can allow for the SIDO power controller 1107 to regulate both voltage rails. Priority can be given to the more heavily loaded rail, depending on usage. For example, SIDO power controller could prioritize the low or high voltage based on the battery voltage or the voltage drop seen by the load on the low voltage rail.

Figure 12:
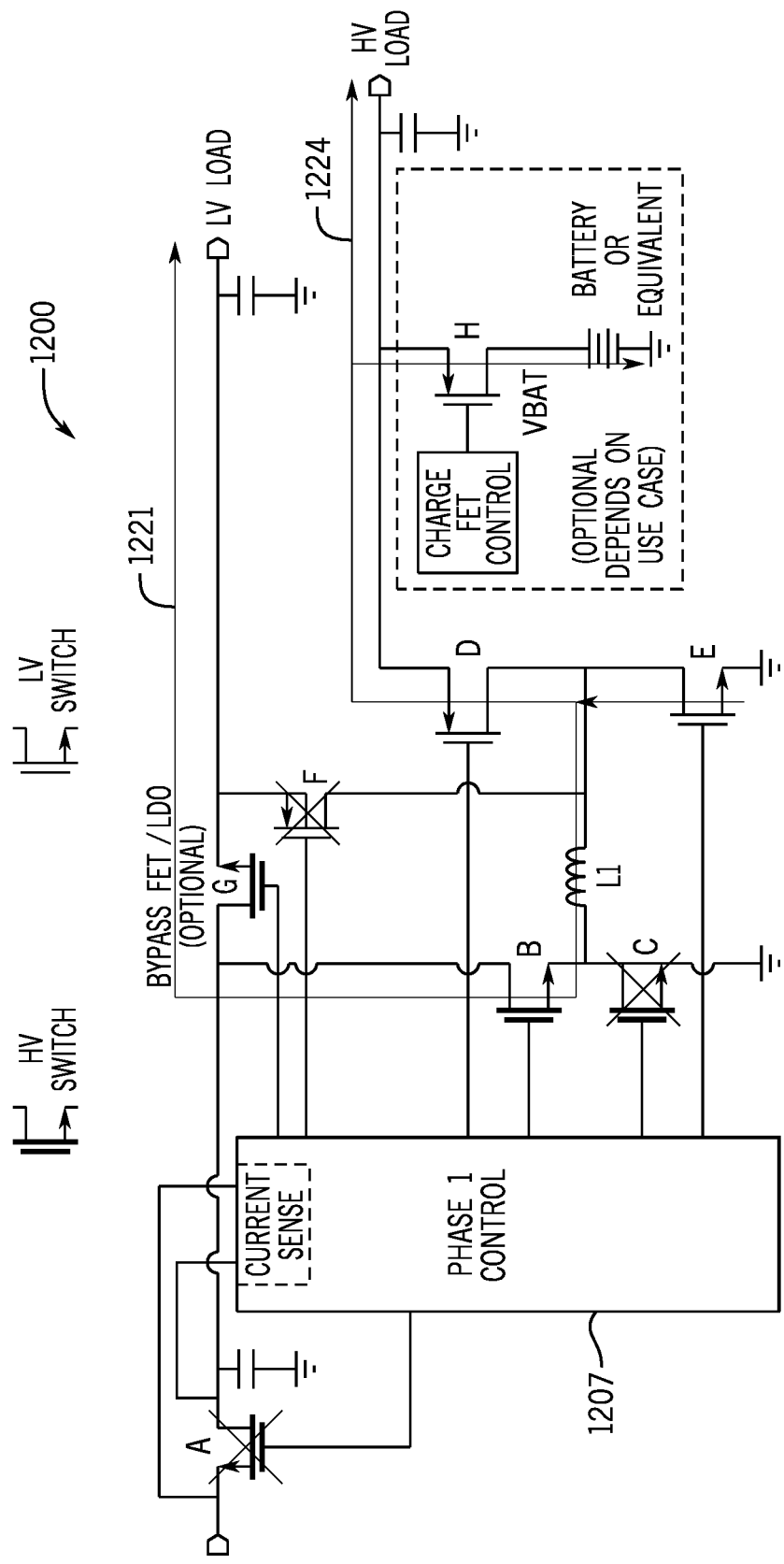
FIG. 12 illustrates a schematic diagram of a dual voltage rail system regulating from a battery with no input source.

FIG. 12 illustrates a schematic diagram of a dual voltage rail system 1200 regulating from a battery with no input source. In this mode, SIDO power controller 1207 can operate switching devices A-G as follows. Switching device A can be opened to disconnect the input, which has no source connected. The low voltage rail LV Load can thus be supplied by bucking down from high voltage battery module 1215. That is, switches D and E can cooperate with single inductor L1 to operate as a buck converter, supplying the low voltage rail via current path 1223. Switching device B can close to couple the buck converter output to the low voltage rail via bypass/LDO switching device G, which would not be optional in this configuration. Switching device G can be operated as a bypass, directly connecting the buck converter output to the low voltage rail LV Load or can be operated as an LDO to provide tighter voltage regulation of the low voltage rail. In either case, switching device C can be opened during this mode. Meanwhile, the high voltage rail HV Load can be powered directly by battery module 1115 during this interval, via current path 1224.

Figure 13:
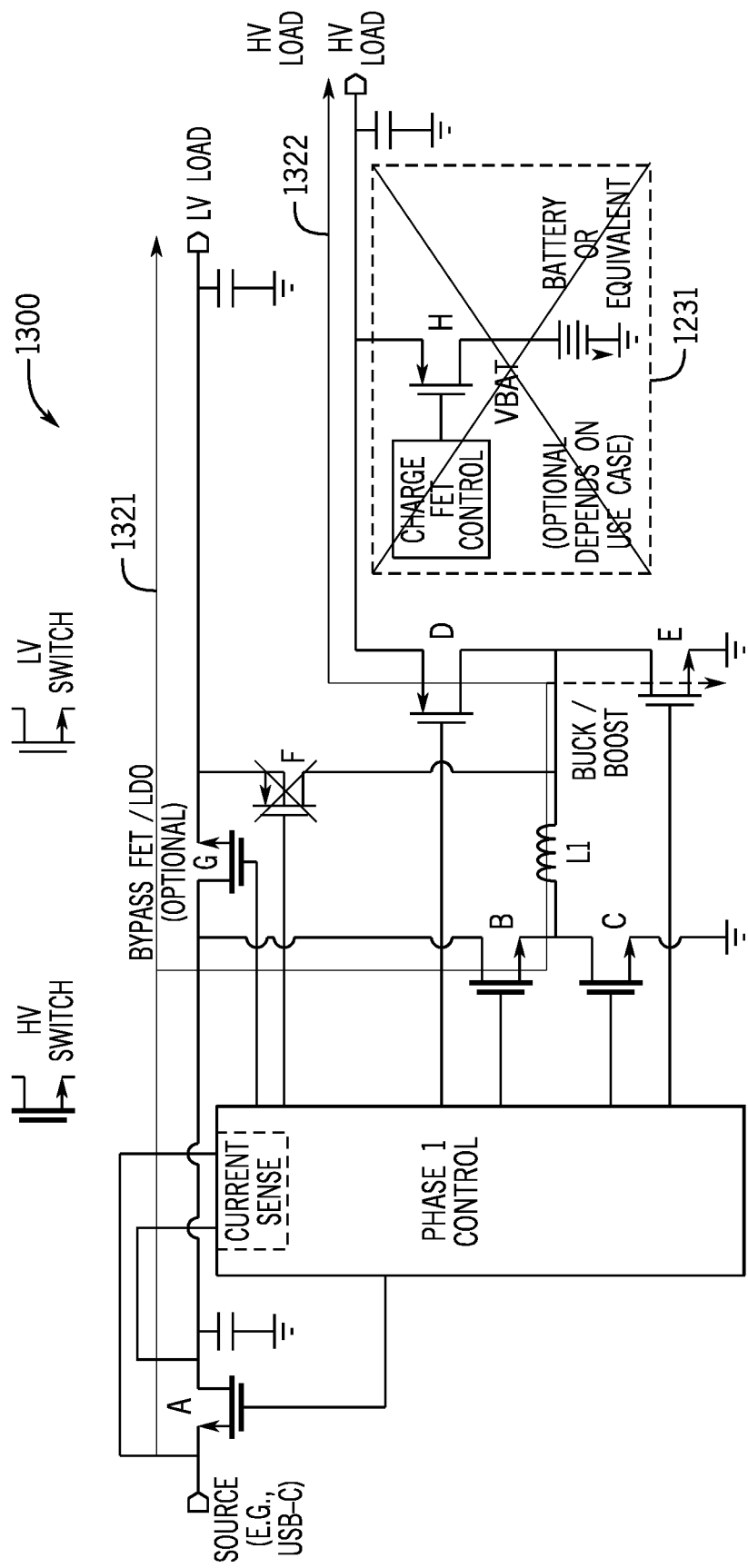
FIG. 13 illustrates a schematic diagram of a dual voltage rail system regulating from an input source, but with no battery connected (e.g., using input current limit control).

FIG. 13 illustrates a schematic diagram of a dual voltage rail system 1300 regulating from an input source, but with no battery connected (e.g., using input current limit control). As an example to which this use case can apply, an attached peripheral or accessory may have no input current limiting feature, so, in the presence of a current limited source, the accessory may have to reserve some power a priori, reducing overall power available to the system. This can result in splitting the power delivery path into a 1-stage average power delivery path and a separate power delivery path that just supplies transient current (only supporting short duration peaks) similar to a large capacitance or a very small battery pack. This type of siphoning can result in less power to the electronic device and therefore less overall performance of the electronic device because it may need to throttle performance or disallow certain functions to account for a lack of input power.

Conversely, as illustrated in FIG. 13, the input source can be coupled to the main rail by closing switching device A. The main rail can be coupled to the low voltage rail LV Load by switching device G. The low voltage rail LV Load can be powering the accessory and can also be powering a low voltage battery (not shown) via current path 1321. Switching device G can be operated as a current limit and/or as an LDO, as appropriate. Switching devices B and C can be operated in conjunction with single inductor L1 as a buck converter to power the high voltage rail HV Load via current path 1322. Alternatively, switching devices B, C, and E can be operated as a buck-boost converter for the same purpose. Which is more appropriate can be responsive to the relative magnitudes of the input voltage and the high voltage rail voltage. In either case, switching device D can be closed to couple the output of the buck/buck-boost to the high voltage rail HV load. Switching device F can be opened to de-couple the buck/buck-boost output from the low voltage rail LV Load.

The foregoing describes exemplary embodiments of SIDO/SIMO converters for powering electronic devices with multiple voltage rails. Such configurations may be used in a variety of applications including devices including battery(ies) and battery charger(s). Although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A power supply for an electronic device having a plurality of voltage rails including at least one low voltage rail and at least one high voltage rail, the power supply comprising a single inductor multiple output (SIMO) converter having a single inductor and:
   an input that receives an input voltage from a source;
   a first output that delivers a low voltage derived from the input voltage and regulated by the SIMO converter to the low voltage rail; and
   a second output that delivers a high voltage derived from the input voltage and regulated by the SIMO converter to the high voltage rail; and
   a battery coupled to at least one of the low voltage rail and the high voltage rail.

2. The power supply of claim 1 wherein the battery is coupled to the low voltage rail.

3. The power supply of claim 2 wherein the battery coupled to the low voltage rail has a 1S configuration, and the low voltage rail has a corresponding voltage.

4. The power supply of claim 2 wherein the SIMO converter derives the high voltage from the energy storage device if the input voltage is unavailable.

5. The power supply of claim 1 wherein the battery is coupled to the high voltage rail.

6. The power supply of claim 5 wherein the battery coupled to the high voltage rail has a 2S configuration, and the high voltage rail has a corresponding voltage.

7. The power supply of claim 5 wherein the SIMO converter derives the low voltage from the energy storage device if the input voltage is unavailable.

8. A single inductor multiple output (SIMO) converter for producing a regulated low voltage for a low voltage rail and a regulated high voltage for a high voltage rail, the SIMO converter comprising:
   a single inductor;
   a plurality of switching devices selectively operable as switching converters for producing the regulated low voltage and the regulated high voltage, wherein the plurality of switching devices include:
      a first switching device coupled between a main rail of the SIMO converter and a first terminal of the single inductor;
      a second switching device coupled between the first terminal of the single inductor and ground;
      a third switching device coupled between a second terminal of the single inductor and the high voltage rail;
      a fourth switching device coupled between the second terminal of the single inductor and ground; and
      a fifth switching device coupled between the second terminal of the single inductor and the low voltage rail; and
   a SIMO power controller including control circuitry that selectively operates the plurality of switching devices responsive at least in part to an input voltage and the regulated low voltage and the regulated high voltage.

9. The SIMO converter of claim 8 further comprising one or more additional phases, each additional phase including an additional inductor, wherein the SIMO power controller comprises additional control circuitry for each of the one or more additional phases.

10. The SIMO converter of claim 8 wherein the plurality of switching devices includes at least one switching device selectively operable to connect and disconnect the input voltage.

11. The SIMO converter of claim 8, wherein responsive to the input voltage being higher than the regulated low voltage and lower than the regulated high voltage the SIMO power controller control circuitry alternates between:
   a first operating mode in which the first and second switching devices are operated in conjunction with the single inductor as a buck converter to produce the regulated low voltage, the fifth switching device is closed to couple the second terminal of the single inductor to the low voltage rail, and the third switching device is opened to decouple the second terminal of the single inductor from the high voltage rail; and
   a second operating mode in which the second switching device is closed to couple the main rail to the first terminal of the single inductor, the third, fourth, and fifth switching devices are operated in conjunction with the single inductor as a boost converter to produce the regulated high voltage, and the fifth switching device is opened to decouple the second terminal of the single inductor from the low voltage rail.

12. The SIMO converter of claim 11 wherein if a large load is connected to the low voltage rail, the SIMO power controller control circuitry alternates between the first and second operating modes and a third operating mode in which the fifth switching device is opened to decouple the second terminal of the single inductor from the low voltage rail, the first switching device is closed to couple the first terminal of the single inductor to the low voltage rail via a sixth switching device operated by the SIMO power controller control circuitry as at least one of a bypass switch or a low dropout regulator, and the third and fourth switching devices are operated as a buck converter to produce the regulated low voltage from an energy storage device coupled to the high voltage rail.

13. The SIMO converter of claim 8, wherein responsive to the input voltage being close to the regulated low voltage the SIMO power controller control circuitry alternates between:
   a first operating mode in which the first, second, and fourth switching devices are operated in conjunction with the single inductor as a buck-boost converter to produce the regulated low voltage, the fifth switching device is closed to couple the second terminal of the single inductor to the low voltage rail, and the third switching device is opened to decouple the second terminal of the single inductor from the high voltage rail; and
   a second operating mode in which the second switching device is closed to couple the main rail to the first terminal of the single inductor, the third, fourth, and fifth switching devices are operated in conjunction with the single inductor as a boost converter to produce the regulated high voltage, and the fifth switching device is opened to decouple the second terminal of the single inductor from the low voltage rail.

14. The SIMO converter of claim 13 wherein if a large load is connected to the low voltage rail, the SIMO power controller control circuitry alternates between the first and second operating modes and a third operating mode in which the fifth switching device is opened to decouple the second terminal of the single inductor from the low voltage rail, the first switching device is closed to couple the first terminal of the single inductor to the low voltage rail via a sixth switching device operated by the SIMO power controller control circuitry as at least one of a bypass switch or a low dropout regulator, and the third and fourth switching devices are operated as a buck converter to produce the regulated low voltage from an energy storage device coupled to the high voltage rail.

15. The SIMO converter of claim 8, wherein responsive to the input voltage being higher than the regulated high voltage the SIMO power controller control circuitry alternates between:
 a first operating mode in which the first and second switching devices are operated in conjunction with the single inductor as a buck converter to produce the regulated low voltage, the fifth switching device is closed to couple the second terminal of the single inductor to the low voltage rail, and the third switching device is opened to decouple the second terminal of the single inductor from the high voltage rail; and
 a second operating mode in which the first and second switching devices are operated in conjunction with the single inductor as a buck converter to produce the regulated high voltage, the third switching device is closed to couple the second terminal of the single inductor to the high voltage rail, and the fifth switching device is opened to decouple the second terminal of the single inductor from the low voltage rail.

16. The SIMO converter of claim 8, wherein responsive to the input voltage being close to the regulated high voltage the SIMO power controller control circuitry alternates between:
 a first operating mode in which the first and second switching devices are operated in conjunction with the single inductor as a buck converter to produce the regulated low voltage, the fifth switching device is closed to couple the second terminal of the single inductor to the low voltage rail, and the third switching device is opened to decouple the second terminal of the single inductor from the high voltage rail; and
 a second operating mode in which the first, second, and fourth switching devices are operated in conjunction with the single inductor as a buck converter to produce the regulated high voltage, the third switching device is closed to couple the second terminal of the single inductor to the high voltage rail, and the fifth switching device is opened to decouple the second terminal of the single inductor from the low voltage rail.

17. The SIMO converter of claim 8, wherein responsive to an absence of the input voltage, the SIMO power controller control circuitry operates in a mode in which the fifth switching device is opened to decouple the second terminal of the single inductor from the low voltage rail, the first switching device is closed to couple the first terminal of the single inductor to the low voltage rail via a sixth switching device operated by the SIMO power controller control circuitry as at least one of a bypass switch or a low dropout regulator, and the third and fourth switching devices are operated as a buck converter to produce the regulated low voltage from an energy storage device coupled to the high voltage rail.

18. The SIMO converter of claim 8, wherein responsive to connection of a load without current limiting being attached to the low voltage rail, the SIMO power controller control circuitry operates in a mode in which the first and second switching devices are operated in conjunction with the single inductor as a buck converter to produce the regulated high voltage; the fourth switching device is closed to couple the second terminal of the single inductor to the high voltage rail, the fifth switching device is opened to decouple the second terminal of the single inductor from the low voltage rail, and a sixth switching device coupled between the main rail and the low voltage rail is operated as a current limiting device.

19. The SIMO converter of claim 8, wherein responsive to connection of a load without current limiting being attached to the low voltage rail, the SIMO power controller control circuitry operates in a mode in which the first, second, and fourth switching devices are operated in conjunction with the single inductor as a buck-boost converter to produce the regulated high voltage; the fourth switching device is closed to couple the second terminal of the single inductor to the high voltage rail, the fifth switching device is opened to decouple the second terminal of the single inductor from the low voltage rail, and a sixth switching device coupled between the main rail and the low voltage rail is operated as a current limiting device.

* * * * *